United States Patent [19]

Efimov et al.

[11] 4,335,088

[45] Jun. 15, 1982

[54] PROCESS FOR PRODUCING AMMONIUM CARBONATE

[76] Inventors: Vladimir M. Efimov, ulitsa Tsjurupy, 8, korpus 2, kv. 1; Tatyana N. Naumova, ulitsa Festivalnaya, 27, kv. 39; Irina G. Bykova, Otkrytoe shosse, 1, korpus 7, kv. 66, all of Moscow; Larisa A. Stroganova, poselok Firsanovka, ulitsa Rechnaya, 6, kv. 14, Moskovskaya oblast, all of U.S.S.R.

[21] Appl. No.: 238,615

[22] Filed: Feb. 26, 1981

[51] Int. Cl.$^3$ .............................................. C01C 1/26
[52] U.S. Cl. .................................................. 423/420
[58] Field of Search ................... 423/419 R, 420, 421, 423/422, 429; 562/555

[56] References Cited

U.S. PATENT DOCUMENTS

| | | | |
|---|---|---|---|
| 1,004,361 | 9/1911 | Bulb | 423/420 |
| 1,018,406 | 2/1912 | Bulb | 423/420 |
| 1,209,258 | 12/1916 | Bradley | 423/420 |
| 1,211,393 | 1/1917 | Bosch | 423/420 |
| 1,344,673 | 1/1920 | Bosch | 562/555 |
| 2,189,826 | 2/1940 | Windecker et al. | 423/421 |

FOREIGN PATENT DOCUMENTS

| | | | |
|---|---|---|---|
| 1097430 | 1/1961 | Fed. Rep. of Germany | 562/555 |
| 509536 | 7/1976 | U.S.S.R. | 423/420 |

*Primary Examiner*—Gary P. Straub

[57] ABSTRACT

The process for producing ammonium salt of carbonic acid according to the present invention comprises interaction of gaseous ammonia, carbon dioxide and water vapors in the presence of a hydrogen halide.

1 Claim, No Drawings

PROCESS FOR PRODUCING AMMONIUM CARBONATE

FIELD OF THE INVENTION

The present invention relates to the inorganic synthesis and, more specifically, to a process for producing ammonium carbonate.

Ammonium carbonate produced by the process of the present invention is useful in the radio-engineering, electrical engineering, semiconductor manufacture, food and chemical industries.

BACKGROUND OF THE INVENTION

Known in the art are processes for the production of ammonium carbonates which comprise interaction of gaseous ammonia and carbon dioxide in the presence of water, both as vapours and liquid (cf. German Pat. Nos. 237,524 and 448,758).

Depending on proportions between the reacting gases, salts of various compositions and mixtures thereof can be obtained (cf. E. Jänecke, Zietsrift für Electrochemie, 35, 716/1926/).

| Salt | Formula | M.W. | Content, % by mass, of |||
|---|---|---|---|---|---|
|  |  |  | $NH_3$ | $CO_2$ | $H_2O$ |
| 1 | 2 | 3 | 4 | 5 | 6 |
| Ammonium bicarbonate | $NH_4HCO_3$ | 79 | 21.54 | 55.66 | 22.8 |
| Ammonium carbonate | $(NH_4)_2CO_3$ | 96 | 35.45 | 45.80 | 18.75 |
| Ammonium carbonate monohydrate | $(NH_4)_2CO_3 \cdot H_2O$ | 114 | 29.85 | 38.56 | 31.58 |
| Ammonium carbamate | $NH_4COONH_2$ | 78 | 43.63 | 56.37 | 0 |
| Ammonium carbamate monohydrate | $NH_4COONH_2 \cdot H_2O$ | 96 | 35.45 | 45.80 | 18.75 |
| Ammonium bicarbonate-monohydrate | $2NH_4HCO_3(NH_4)_2-CO_3 \cdot H_2O$ | 272 | 25.02 | 48.50 | 26.48 |
| Ammonium bicarbonate-carbamate | $NH_4HCO_3NH_4COONH_2$ | 157 | 32.52 | 56.02 | 11.46 |

The desired product produced by the above-described processes is formed on the reactor surfaces, through which the heat evolved during the reaction is removed, in the form of a solid monolithic layer, thus substantially hindering discharging of the product.

Also known is a continuous process for the production of ammonium carbonates from liquid ammonia, carbon dioxide and water vapours, wherein the desired product is formed within the reactor working space in the form of fine particles which fall to the reactor bottom and are discharged by means of a screw conveyor. (Cf. USSR Inventor's Certificate No. 220246).

The process is conducted at the temperature of 10° C. under the pressure of 80 mm Hg. The reactor walls do not participate in the heat removal and the product is not formed thereon, since the heat evolved in the reaction is compensated by evaporation and expansion of liquid ammonia.

However, to maintain the temperature in the reactor at 10° C., it is necessary to have substantially 2-time excess of ammonia and continuous evacuation from the reactor. The product yield based on ammonia is about 50%, while for a total utilization of ammonia additional purification thereof from carbon dioxide and liquefaction are required which are additional steps complicating the process.

Preparation of ammonium carbamate from liquid ammonia and liquid carbon dioxide (cf. FRG Pat. No. 1,097,430) by bulk condensation, is carried out in an excess of carbon dioxide, full utilization whereof for increasing the desired product yield is only possible after purification from ammonia and liquefaction which again hinders the process.

OBJECT OF THE INVENTION

It is an object of the present invention to obtain a bulky desired product simultaneously with increasing yield thereof.

SUMMARY OF THE INVENTION

This object is accomplished by a process for producing ammonium carbonate by reacting gaseous ammonia, carbon dioxide gas and water vapours, wherein, according to the present invention, the reaction is carried out in the presence of a hydrogen halide.

The presence of hydrogen halides makes it possible to bring the utilization of reagent gases up to 100% by mass, thus increasing the yield of the desired ammonium carbonate by 2 times as compared to the prior art process. Furthermore, the desired product is obtained in the form of a bulky product which makes it possible to reduce the power consumption for the process by 30%.

With the view to increase the yield and improve quality of the desired product, it is advisable to use a hydrogen halide in an amount ranging from $1 \cdot 10^{-3}$ to $1 \cdot 10^{-6}$% by mass.

DETAILED DESCRIPTION OF THE INVENTION

The process according to the present invention is carried out in the following manner.

The synthesis reactor and system of pipelines are filled with carbon dioxide, whereafter into the reactor through the nozzles the reagents are supplied continuously: ammonia, carbon dioxide, water vapour in different proportions depending on the desired composition of the resulting salt. Within the working space of the reactor there occurs the formation of crystals of ammonium carbonate with a particle size of from 10 to 20μ, the crystals fall by gravity into the bottom section of the apparatus—collector.

The use of hydrogen halides makes it possible to carry out the process of bulk condensation according to the heterogeneous type on the formed "nuclei" of ammonium halide at low oversaturations of ammonium carbonates (temperature = 20°–25° C., pressure 760–780 mm Hg). Under these conditions the rate of the homogeneous condensation process is very low due to a low speed of formation of "seeds" of ammonium salts of carbonic acid.

The reaction proceeds substantially completely—the reagent gases are utilized to about 100%, while the unreacted gases—reagents are recycled into the process after passing through a filter, whereupon fine particles of ammonium carbonate are deposited. Owing to the recycle of the reagent gases no pollution of the atmosphere takes place.

The above-specified range of concentrations of a hydrogen halide ($1.10^{-3}$ to $1.10^{-6}$% by mass) is optimal, since upon decreasing of its concentration in the system, for example to $1.10^{-7}$% by mass, the concentration of "seeds" of ammonium halide is small, wherefore the formation of the product proceeds at a low speed, the degree of utilization of the reagent gases is lowered and the product yield within the apparatus volume is reduced. Increasing concentration of hydrogen halide above the upper limit (over $10^{-3}$% by mass) results in contamination of the product salt with the halide.

Weight dispensing of the hydrogen halide introduced for the formation of seeds in the process can be effected in different modes. In the specific examples illustrating the process according to the present invention given hereinbelow the hydrogen halide is introduced by saturation of carbon dioxide with vapours of hydrogen-halide acids of different concentrations at a specific temperature.

EXAMPLE 1

The reaction vessel is filled with gaseous carbon dioxide and then admission of ammonia is started. Carbon dioxide gas is preliminary saturated with vapours of hydrogen chloride by passing it through a solution of hydrochloric acid (10%) at room temperature and water vapours being at the temperature of 70° C. The concentration of the hydrogen halide in gaseous carbon dioxide is $4.10^{-4}$% by mass. The rate of supply of carbon dioxide gas is 26 l/hr, that of ammonia—48 l/hr. The excessive pressure (gauge pressure) in the system is 20 mm $H_2O$. The process is conducted continuously for 10 hours.

The product is formed as particles with a size of 10 to 20$\mu$. The unreacted gas is purified from fines and recycled. The amount of the product settled on the filter is 8.5 g/hr. The amount of the resulting product is 93.5 g/hr which corresponds to 93.5% of the theoretical yield.

The product has the following composition, % by mass: $CO_2$—51, $NH_3$—37, $H_2O$—12. The content of chlorine impurity is below $1.10^{-3}$% by mass.

EXAMPLE 2

The reactor is preliminary filled with gaseous carbon dioxide and then admission of ammonia is started. Carbon dioxide gas is preliminary saturated with vapours of hydrogen chloride by passing it through a solution of hydrochloric acid (2% concentration) at room temperature. The concentration of the hydrogen halide in gaseous carbon dioxide is $6.10^{-6}$% by mass.

The flow rate of carbon dioxide gas is 28 l/hr, that of ammonia—56 l/hr, gauge pressure in the system is 15-20 mm $H_2O$; the process is conducted continuously for 8 hours.

The product has a particle size of 10-20$\mu$. The unreacted gases purified from fines on the filter are recycled into the process. The amount of the product on the filter is 12 g/hr. The amount of the resulting product is 97 g/hr, which corresponds to 97% of the theoretical yield.

The product has the following composition, % by mass: $CO_2$—57, $NH_3$—43, $H_2O$—$5.10^{-1}$. The content of chlorine impurity is $5.10^{-5}$% by mass.

EXAMPLE 3

The reactor is filled with carbon dioxide gas, whereafter admission of ammonia is started. Carbon dioxide is preliminary saturated with vapours of hydrogen fluoride by passing it through a 5% solution of hydrofluoric acid and with vapours of water being at the temperature of 70° C. The concentration of the hydrogen halide in carbon dioxide gas is $1.10^{-3}$% by mass.

The flow rate of carbon dioxide is 28 l/hr, that of ammonia is 42 l/hr. The gauge pressure is 10 mm $H_2O$. The process is conducted continuously for 5 hours.

The product is formed as particles with a size of 10 to 20$\mu$. The unreacted gases are purified on the filter from the entrained particles and recycled into the process. The amount of the product on the filter is 3 g/hr.

The product yield is 93 g/hr or 93% of the theoretical. The product has the following composition, % by mass: $CO_2$—56, $NH_3$—32, $H_2O$—12; the content of fluorine impurity is $1.10^{-3}$% by mass.

EXAMPLE 4

The reactor is filled with carbon dioxide gas, whereafter admission of ammonia is started. Carbon dioxide is preliminary saturated with vapours of hydrogen bromide by passing it through a 20% solution of hydrobromic acid at room temperature and with water vapours being at the temperature of 65° C. The concentration of the hydrogen halide in carbon dioxide gas is equal to $1.10^{-5}$% by mass.

The flow rate of carbon dioxide gas is 23 l/hr, that of ammonia is 45 l/hr. The gauge pressure is 15 mm $H_2O$. The process is conducted continuously for 3 hours.

The unreacted gases are purified on the filter from the entrained fine particles and recycled into the process.

The amount of the product on the filter is 7 g/hr.

The product yield is 94 g or 94% of the theoretical. The product has the following composition, % by mass: $CO_2$—46, $NH_3$—35, $H_2O$—19, the bromine impurity content is below $1.10^{-3}$% by mass.

EXAMPLE 5

The reactor is preliminarily filled with carbon dioxide and then admission of ammonia is started. Carbon dioxide is preliminarily saturated with vapours of hydrogen fluoride by passing it through a solution of hydrofluoric acid (5% concentration) at room temperature. The concentration of the hydrogen halide in carbon dioxide is 28 l/hr, that of ammonia is 56 l/hr. The process is conducted continuously for one hour. The resulting product has a particle size of from 10 to 20$\mu$. The unreacted gas is cleaned from fine particles and recycled into the process. The amount of the product on the filter is about 10 g/hr. The yield of the product is 98 g/hr or 98%; the content of fluorine impurity is below $10^{-3}$% by mass.

What is claimed is:

1. In a process for producing ammonium carbonate salts comprising interaction of gaseous ammonia, gaseous carbon dioxide and water vapor, the improvement wherein hydrogen halide is introduced into the reaction zone in a concentration in said carbon dioxide ranging from $1 \times 10^{-3}$ to $1 \times 10^{-6}$ percent by mass.

* * * * *